United States Patent [19]

Eckberg et al.

[11] Patent Number: 5,369,205
[45] Date of Patent: Nov. 29, 1994

[54] UV-CURABLE EPOXYSILICONES BEARING PENDANT SILICONE RESIN

[75] Inventors: Richard P. Eckberg, Saratoga Springs; Roy M. Griswold, Ballston Spa, both of N.Y.

[73] Assignee: General Electric Company, Waterford, N.Y.

[21] Appl. No.: 923,112

[22] Filed: Jul. 30, 1992

[51] Int. Cl.⁵ .......................... C08F 2/50; C08G 77/46
[52] U.S. Cl. ............................ 528/25; 528/27; 528/31; 528/32; 528/15; 522/170; 522/172; 522/31
[58] Field of Search .............. 528/25, 31, 26, 27, 528/32; 522/170, 172

[56] References Cited

U.S. PATENT DOCUMENTS

| | | | |
|---|---|---|---|
| 3,527,659 | 9/1970 | Keil | 117/145 |
| 4,123,604 | 10/1978 | Sandford | 528/31 |
| 4,150,048 | 4/1979 | Schilling, Jr. et al. | 521/112 |
| 4,171,397 | 10/1979 | Morrow | 428/195 |
| 4,208,504 | 6/1980 | Hockmeyer | 528/15 |
| 4,261,876 | 4/1981 | Reusser | 428/447 |
| 4,279,717 | 7/1981 | Eckberg et al. | 428/413 |
| 4,421,904 | 12/1983 | Eckberg et al. | 528/27 |
| 4,476,252 | 10/1984 | Esselborn et al. | 521/172 |
| 4,547,431 | 10/1985 | Eckberg et al. | 428/413 |
| 4,576,999 | 3/1986 | Eckberg | 525/476 |
| 4,600,751 | 7/1986 | Lee et al. | 525/404 |
| 4,882,201 | 11/1989 | Crivello et al. | 522/15 |
| 4,906,718 | 3/1990 | Gornowicz et al. | 528/31 |
| 4,952,657 | 8/1990 | Riding et al. | 528/27 |
| 4,977,198 | 12/1990 | Eckberg et al. | 522/25 |
| 4,987,158 | 1/1991 | Eckberg | 522/31 |
| 4,990,546 | 2/1991 | Eckberg | 522/170 |
| 5,086,148 | 2/1992 | Jochum et al. | 528/31 |
| 5,145,879 | 9/1992 | Budnik et al. | 528/31 |
| 5,158,991 | 10/1992 | Riding | 522/170 |
| 5,240,971 | 8/1993 | Eckberg et al. | 522/170 |

Primary Examiner—Susan W. Berman

[57] ABSTRACT

Epoxy functional silicone materials incorporating vinyl containing multifunctional resins form control release additives when the resins are first partially crosslinked by means of a hydrosilation reaction with a low molecular weight SiH silicone fluid and the reaction product is reacted with an epoxy containing material in a second hydrosilation reaction. The resulting materials function as control release additives in pressure sensitive adhesives.

18 Claims, No Drawings

UV-CURABLE EPOXYSILICONES BEARING PENDANT SILICONE RESIN

BACKGROUND OF THE INVENTION

Curable silicone coatings for release of pressure-sensitive adhesives (PSA) are known. These coatings may be cured via tin-catalyzed condensation reactions, platinum-catalyed addition reactions, or radiation-initiated crosslinking reactions.

Linear polydimethyl siloxanes form what are referred to as premium or low release coatings. When cross-linked, these materials form abhesive surfaces from which a PSA-laminated facestock may be detached with very little force required. Such premium release characteristic is desirable for many applications.

There are however, significant applications for silicone release coatings which do not provide easy release from PSA's. Such coatings which provide a tight or controlled release characteristic are desirable, for example, in industrial labeling operations which run at high speed. A high release silicone agent is desirable in order to prevent so-called premature dispensing of the label from the release liner. A controlled release characteristic is useful for two-sided release laminate applications wherein one side of the laminate is coated with a premium release silicone and the other side is coated with a tight release silicone, thus providing a differential release structure.

Ideally, silicone release systems that have a range of release characteristics are desirable. Such silicone coating systems would enable an end-user to selectively adjust the formulation to give the desired level of release depending on the specific application. A tight release polymer capable of giving a range of release levels in a blend with premium release polymer is referred to as a controlled release additive (CRA).

Ultraviolet light-curable silicone release coatings based on epoxysilicone polymers, as taught by Eckberg et al., U.S. Pat. No. 4,279,717, are widely used in the release coating and pressure-sensitive adhesive (PSA) industries. For example, see generally the chapter entitled "Silicones" by B. Hardman and A. Torkelson in the *Encyclopedia of Polymer Science and Engineering*, 2nd edit., Vol. 15, pp. 204–308, 1989, John Wiley & Sons, Inc., New York. Epoxysilicone polymers are conveniently manufactured through the hydrosilation reaction between an SiH-containing silicone monomer or polymer, and olefin epoxides. The general hydrosilation reaction between a silicone and olefin can be expressed for monofunctional silane derivatives as

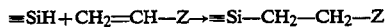
$\equiv$SiH+CH$_2$=CH—Z→$\equiv$Si—CH$_2$—CH$_2$—Z and for di-functional siloxane derivatives as

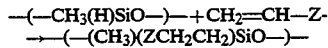
—(—CH$_3$(H)SiO—)—+CH$_2$=CH—Z-
→—(—CH$_3$)(ZCH$_2$CH$_2$)SiO—)— where in both cases Z is an organic radical. The hydrosilation reaction is particularly useful for the addition of functional radicals onto silanes and silicones. For example, reaction of a hydrogensiloxane with an epoxy-containing olefin yields an epoxy-functional siloxane.

Epoxysilicones generated through, for example, the hydrosilation reaction can be cured either thermally or, in the presence of the appropriate catalysts and possibly accelerators, by irradiation. Generally, UV-induced, cationic catalysis is preferred in the cure reaction of epoxysilicones due to the relatively high cure rates achieved, and the low temperature which can be employed, thereby preventing damage to temperature-sensitive materials being coated, and the low risk of potential hazards to both industrial users and the environment. Upon exposure to UV radiation, cationic type photo-initiators generate a strong Brönsted acid, which effects the opening of the oxirane ring in the epoxide radical of an epoxysilicone polymer, and the subsequent etherification through which cross-linking of the resin is achieved.

The curing of epoxysilicone polymers is well documented in the patent literature. For example, U.S. Pat. No. 4,576,999, issued to Eckberg, discloses epoxy and-/or acrylic functional polysiloxanes as UV-curable adhesive release coatings. The catalyst may be a photo-initiating onium salt and/or a free radical photo-initiating catalyst. U.S. Pat. Nos. 4,279,717 and 4,421,904, both issued to Eckberg, et al., disclose epoxy functional diorganosiloxane fluids combined with iodonium salts to form UV-curable adhesive release compositions. U.S. Pat. No. 4,547,431 discloses an epoxy functional diorganosiloxane combined with onium salt catalyst and polyfunctional epoxy monomers to also form an adhesive coating.

As described in U.S. Pat. No. 4,576,999, the preferred UV photo-initiators for the curing of epoxysilicones are the "onium" salts, of the general formulae:

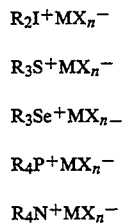

$R_2I^+MX_n^-$ $R_3S^+MX_n^-$ $R_3Se^+MX_n^-$ $R_4P^+MX_n^-$ $R_4N^+MX_n^-$ where different radicals represented by R can be the same or different organic radicals from 1 to about 30 carbon atoms, including aromatic carbocyclic radicals from 6 to 20 carbon atoms which can be substituted with from 1 to 4 monovalent radicals selected from $C_{(1-8)}$alkoxyl, $C_{(1-8)}$alkyl, nitro, chloro, bromo, cyano, carboxy, mercapto, etc., and also including aromatic heterocyclic radicals including, for example, pyridyl, thiopheny, puranyl, and others; and $MX_n^-$ is a non-basic, non-nucleophilic anion, such as $BF_4^-$, $PF_6^-$, $AsF_6^-$, $SbF_6^-$, $HSO_4^-$, $ClO_4^-$, and others as known in the art. The photo-initiators may be mono- or multi-substituted mono, bis or tris aryl salts. In the above and subsequent definitions, the prefix "hetero" is meant to include linear or cyclic organic radicals having incorporated therein at least one non-carbon and non-hydrogen atom, and is not meant to be limited to the specific examples contained herein. According to U.S. Pat. No. 4,977,198, the onium salts are well known, particularly for use in catalyzing cure of epoxy functional materials.

As disclosed in U.S. Pat. No. 4,279,717, the radiation-initiated cure of epoxysilicones coated on a substrate can be achieved with UV lamps such as: mercury arc lamps, (high, medium and low pressure), Xenon arc lamps, high intensity halogen-tungsten arc lamps, microwave driven arc lamps and lasers.

Thermal-cure silicone release systems as in Sandford, U.S. Pat. No. 4,123,604 and Keil, U.S. Pat. No. 3,527,659 make use of silicone resins, specifically Q-containing resins, to provide tight release for CRAs. Alternative compositions described as being useful CRAs are limited to solvent-dispersed products, such as disclosed in Morrow, U.S. Pat. No. 4,171,397, Reusser, U.S. Pat. No. 4,261,876 and Hockemeyer, U.S. Pat. No. 4,208,504. UV cure epoxysilicone release agents, such as disclosed by Eckberg et al., U.S. Pat. No. 4,279,717 are premium release agents, particularly when applied to film or plastic substrates.

CRAs for epoxysilicone systems have been produced by syntheses of epoxysilicone polymers incorporating polar phenolic and benzoate ester functional groups in the polymer along with reactive cycloaliphatic epoxy groups, as disclosed by Eckberg et al. in U.S. Pat. Nos. 4,952,657 and 4,977,198, respectively. These compositions, however, have proven to be slower-curing than the low release epoxysilicones with which they are to be blended, and are generally not useful at concentrations below 70 wt % of the total coating bath, particularly against non-aggressive rubber or hot melt adhesives.

A major drawback to the use of the "onium" salt catalysts in the polymerization of epoxysilicones lies in the highly polar nature of these salts. As the commonly used silicones are based on non-polar polydimethylsiloxane polymers, the polar "onium" catalysts are not sufficiently miscible with the resin to affect as fast a cure rate as would generally be desirable nor are suspensions of the insoluble catalysts stable. The need therefore exists to devise novel materials and processes in which the miscibility of the photo-initiators and siloxanes are much improved.

Two general approaches have been taken to increase the miscibility of an onium photo-initiator and an epoxysilicone resin. The first approach has been to increase the hydrophobicity of the catalyst through use of onium salts containing non-polar, organic radicals. This approach led to investigations of potential onium salts, particularly long-chain alkyl-substituted bisaryliodonium salts, which are less polar in nature than their sulfonium counterparts. As disclosed in U.S. Pat. Nos. 4,882,201 and 4,279,717, particularly useful catalysts of this type are the linear or branched, $C_8$ or greater alkyl and alkoxy, mono- or disubstituted, bisaryliodonium salts. As further disclosed in U.S. Pat. No. 4,882,201, the long-chain, alkoxy-substituted aryliodonium salts also possesses the useful property of being much less toxic than the non-substituted onium salt photo-initiators.

A second approach to alleviating the aforementioned miscibility problem between the photo-initiator and a silicone has been to incorporate silphenylene blocks into a siloxane backbone, for example as disclosed in U.S. Pat. No. 4,990,546. This approach, when coupled with the use of the above-described substituted onium salts, proved useful in increasing photo-initiated cure. However, the incorporation of silphenylene blocks into a silicone resin is not commercially viable for release coating applications, since the disilyl-functional benzenes needed to produce the silphenylene-containing polymers are not available in commercial quantities.

In a more indirect effort to overcome the relatively slow cure rates due to the above-mentioned miscibility problem, an epoxysilicone polymer is pre-crosslinked as disclosed, for example, in U.S. Pat. No. 4,987,158. While such pre-crosslinked epoxysilicone networks, formed from vinyl tetramer and SiH-containing linear silicones, partially overcome some of the slow cure associated with long chain epoxysilicone coatings which are not rich in epoxy content, these partially-cured resins still do not possess a solubility with iodonium catalysts that is sufficiently high to be commercially useful as UV-curable materials in most applications.

Attempts have been made to utilize silicone resins with linear UV-curable epoxysilicone fluids for CRA applications. These have been unsuccessful because non-functional Q resins do not cure into the UV-cured release coating, and epoxy-functional Q resins thus far produced are high viscosity materials or solids in the neat form which are immiscible with known premium release silicone polymers without use of solvent carriers.

Due to the above-mentioned considerations, it has therefore been desirable to increase the miscibility of polar compounds, particularly photo-initiator salts, in epoxysilicone resins such that high and efficient cure rates can be economically achieved. In addition, it would also be advantageous to, at the same time, provide for epoxysilicones that are useful as CRAs and in particular are effective to control the release properties over a broad range of values.

SUMMARY OF THE INVENTION

In a particular embodiment, the invention is directed to a UV curable epoxy-functional silicone polymer formed by the hydrosilation reaction of a vinyl containing multifunctional resin and a low molecular weight SiH-containing silicone fluid, prior to the introduction of epoxy in a second hydrosilation reaction.

It has been discovered that a novel synthesis of epoxysilicone polymer incorporating Q-type resin structures results in compositions which are faster-curing and which more efficiently modify release than the available controlled release products. The compositions are prepared using a pre-crosslinking reaction, wherein an $M^{Vi}MQ$ or $M^{Vi}MTQ$ silicone resin or a mixture of an $M^{Vi}MQ$ or $M^{Vi}MTQ$ resin and a diallylated polyether is pre-crosslinked with a low molecular weight SiH containing silicone fluid, such that, a portion of available SiH groups of the fluid react via hydrosilation with the vinyl groups of the resin prior to introduction of epoxy in a second hydrosilation reaction of remaining SiH with an olefinic epoxy such as 4-vinylcyclohexeneoxide (VCHO). The resulting product, when used as a CRA for epoxy functional PSAs, results in compositions having a broad range of release characteristics. In one embodiment of the invention, the level of release may be substantially proportional to the amount of CRA.

In a particular embodiment, a method for synthesizing an ultraviolet radiation curable release coating composition is described. The method comprises the steps of reacting (A) a low molecular weight SiH-containing silicone fluid with (B) a silicone resin of the formula $M^{Vi}MQ$ or $M^{Vi}MTQ$ wherein $M^{Vi}$ is a vinyl-substituted monofunctional chainstopper unit $R^{Vi}R_2SiO_{0.5}$ where $R^{Vi}$ is a vinyl-containing aliphatic hydrocarbon radical, preferably —CH=CH$_2$, and R is an aliphatic or aromatic hydrocarbon radical. The silicone resin has a ratio of monofunctional M to tetrafunctional Q units in the range of about 0.3:1 to about 2.5:1. Optionally, reacting (A) with (B) and (B'), an allylated or diallylated polyether of structure CH$_2$=CHCH$_2$O(CHR'CH$_2$O)$_a$R", where a is an integer from 1 to about 50 and R" is H, R, or —CH$_2$CH=CH$_2$. The reaction of (A) with (B) and (B') is such that the total moles of SiH in (A) exceeds the total moles of olefin in (B)+(B') to produce an SiH-containing intermediate composition (C) bearing pendent silicone Q resin or, optionally, (C') an SiH-containing intermediate composition bearing pendent silicone Q resin and pendant polyether blocks. In the method, the SiH groups of (C) or (C') are subsequently reacted with (D) an unsaturated epoxy-containing compound thereby creating (E) an epoxy-functional silicone bearing pendent silicone Q resin or (E') an epoxy-functional silicone bearing pendent silicone Q resin plus pendent polyether block segments.

In the method, (A), the SiH-containing silicone fluid is a linear silicone molecule of general formula

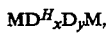

where

M is $R_3SiO_{\frac{1}{2}}$,
$D^H$ is $R(H)SiO_{2/2}$
D is $R_2SiO_{2/2}$ x ranges from about 2 to about 50, y ranges from about 5 to about 500, and R is an aliphatic or aromatic radical. Preferably x is about 2 to about 10, and more preferably about 2 to about 6. Preferably y is about 10 to about 50, and more preferably about 10 to about 20.

(B), the vinyl-functional silicone resin is of the general formula $M^{Vi}MQ$ or $M^{Vi}MTQ$, where $M^{Vi}$ is $CH_2=CH(R)_2SiO_{\frac{1}{2}}$, T is $RSiO_{3/2}$, and Q is $SiO_{4/2}$. The ratio of total M:Q is about 0.3:1.0 to about 2.5:1.0, preferably about 0.5:1.0 to about 1.0:1.0, and more preferably about 0.5:1.0 to about 0.8:1.0. The total weight % vinyl is about 0.5 to about 5.0, preferably about 1.0 to 3.0, and more preferably about 1.0 to 2.0%.

(B'), the allyl-functional polyether is of the general structure $CH_2=CHCHO(CHR'CH_2O)R_z''$, where R' is H, $CH_3$, or $C_2H_5$; and where R" is H, R, or $-CH_2-CH=CH_2$. Preferably z is about 1 to about 50, preferably about 5 to about 30, more preferably about 5 to about 20.

In the method herein disclosed, (C) and (C'), the intermediate reaction product may be represented as, respectively, (C) is $MD_yD^2_nD^H_mM$, where $n+m=x$, and where $D^2$ is $RSi(M^2MQ$ or $M^2MTQ)O_{2/2}$, and where $M^2$ is $-CH_2CH_2SiR_2O_{\frac{1}{2}}$;
and (C') is $MD_yD^2_aD^3_bD^H_cM$,
where $a+b+c=x$, $D^3$ is $RSi(M^3(OCH(R')CH_2)_zOR'')O_{2/2}$, where $M^3$ is $-CH_2CH_2CH_2-$, R' is H, $CH_3$, or $C_2H_5$, and R" is R, H, or $M^3Si\equiv$ is from an adjacent polymer chain. Preferably n is about 1 to about 20, preferably about 1 to about 10, and more preferably from 1 to about 5. Preferably m is about 1 to about 40, preferably about 2 to about 20, and more preferably from about 2 to about 10. Preferably a is about 1 to about 20, preferably about 1 to about 10, and more preferably from 1 to about 5. Preferably b is about 1 to 10, preferably about 0.1 to 5, and more preferably 1 to 3.

(D), the unsaturated epoxy-containing compound is selected from aliphatic, cycloaliphatic, or glycidyl epoxy compounds also bearing olefinic groups capable of undergoing hydrosilation addition reactions with SiH-functional groups; preferably selected from allyl- glycidyl ether, 1-methyl-4-isopropenyl cyclohexeneoxide, 1,4-dimethyl-4-vinylcyclohexeneoxide, and 4-vinyl-cyclohexaneoxide, and more preferably 4-vinyl cyclohexeneoxide.

(E) or (E'), the epoxy-functional silicone being the reaction product of (C) or (C') with (D), respectively, where (E) is $MD_yD^2_nD^E_mM$,

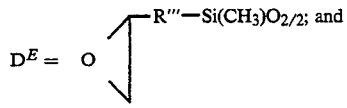

(E') is $MD_yD^2_aD^3_bD^E_cM$, where M, D, $D^2$, $D^3$, $D^E$, y, n, m, a, b, c are as defined above, and where R''' is an aliphatic, aromatic, or ether-containing aliphatic group; most preferably

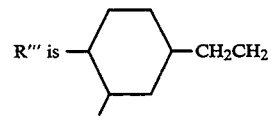

The ultraviolet radiation curable release coating composition of the invention comprises an (E) epoxy-functional silicone bearing pendent silicone Q resin or (E') an epoxy-functional silicone (E') bearing pendent silicone Q resin plus pendent polyether block segments.

(E) or (E') result from the reaction of (A) a low molecular weight SiH-containing silicone fluid and (B) a silicone resin of the formula $M^{Vi}MQ$ or $M^{Vi}MTQ$ wherein $M^{Vi}$ is a vinyl-substituted monofunctional chainstopper unit $R^{Vi}R_2SiO_{0.5}$ where $R^{Vi}$ is a vinyl-containing aliphatic hydrocarbon radical preferably $-CH=CH_2$, and R is an aliphatic or aromatic hydrocarbon radical. Optionally, (E') results from the reaction of (A) with (B) and (B') an allylated or diallylated polyether of structure $CH_2=CHCH_2O(CHR'C-H_2O)_aR''$, where a is an integer from 1 to 50 and R" is H, or R, or $CH_2CH=CH_2$.

In the reaction, the total moles of SiH in (A) exceeds the total moles of olefin in (B)+(B') to produce (C) an SiH-containing intermediate composition bearing pendent silicone Q resin or, optionally, (C'), an SiH-containing intermediate composition bearing pendent silicone Q resin and pendant polyether blocks. A subsequent reaction of the SiH groups of (C) or (C') with (D) an unsaturated epoxy-containing compound thereby produces (E) or (E'). The silicone resin has a ratio of monofunctional M to tetrafunctional Q units in the range of about 0.3:1 to about 2.5:1. (A), (B), (B'), (C'), (D), (E) and (E') are as defined above, and cure is effected in the presence of 'onium salt catalyst.

DESCRIPTION OF THE INVENTION

In accordance with the invention, (A) a low molecular weight SiH containing siloxane fluid is pre-crosslinked with (B) a vinyl containing multifunctional silicone resin or a mixture of (B) and (B'), a diallylated polyether, to produce (C) or (C'), respectively, a pre-crosslinked intermediate. A portion of the SiH reacts by hydrosilation with the vinyl groups. Thereafter, (D) an olefin-epoxy material is introduced, and in a second hydrosilation reaction the remaining SiH from (A) reacts with (D) to form (E), a UV curable epoxy functional silicone bearing pendant silicone resin or (E'), a UV curable epoxy silicone bearing pendant silicone resin plus chemically bonded polyether blocks.

In general, (A) the silicone fluid is a low molecular weight material having the general formula:

$$MD^H_xD_yM$$

where
M is $R_3SiO_{\frac{1}{2}}$,
$D^H$ is $R(H)SiO_{2/2}$,
D is $R_2SiO_{2/2}$,
x ranges from about 2 to about 50, and
y ranges from about 5 to about 500.
(B) the silicone resin may be any of the following:

$$M^{Vi}MQ$$

$$M^{Vi}MTQ$$

where $M^{Vi}$ is a vinyl substituted monofunctional $R^{Vi}R_2SiO_{\frac{1}{2}}$ unit where $R^{Vi}$ is a vinyl containing aliphatic hydrocarbon radical and R is an aliphatic or aromatic hydrocarbon radical, M is $R_3SiO_{\frac{1}{2}}$, Q is $SiO_{4/2}$, T is $RSiO_{3/2}$.

Component (B), the vinyl-functional Q-containing silicone resin, is conveniently prepared by co-hydrolysis of blends of the appropriate silanes. For example, an $M^{Vi}MTQ$ resin is prepared by addition of a solution of dimethylvinyl-chlorosilane, trimethylchlorosilane, methyltrimethoxy-silane, and ethylorthosilicate in xylene to water, followed by isolation of the aromatic solvent fraction and work-up well-known to those skilled in the art.

Component (B') is an allyl-functional polyether, preferably diallyl-stopped, such as $CH_2=CHCH_2O(CH_2CH_2O)_{10}—OCH_2CH=CH_2$. (B') can also be monoallylated, such as $CH_2=CHCH_2O[CHR'CH_2O]_zR'$, where z is an integer and R' is H or $CH_3$ or $C_2H_5$.

Component (B') may be present in the composition of this invention in an amount ranging from 0% to about 50%, preferably from abut 0 to 25%, and more preferably from about 0 to about 10% by weight.

Component (C) is the reaction product of an excess of (A) with (B) such that sufficient unreacted SiH is retained for subsequent reaction with (D), an olefinic epoxide, to produce a UV-curable epoxy-functional silicone polymer product. For example, $MD^H_xD_yM$, component (A), when reacted with $M^{Vi}MQ$ or $M^{Vi}MTQ$ resin such that the SiH groups of (A) are in excess compared with the vinyl groups of the resin (B), provides an intermediate product, component (C), which can be represented as $$MD^2_nD^H_mM$$

where n+m=x, $D^2$ is $RSi(M^2MQ$ or $M^2MTQ)O_{2/2}$, and where $M^2$ is $—CH_2CH_2Si(CH_3)_2O_{\frac{1}{2}}$.

Component (C') is the reaction product of (A) with (B) or (B') or mixtures thereof such that the total amount of reactive SiH in (A) is sufficiently greater than the combined amount of olefin in the components (B) and (B') to permit subsequent reaction with the olefin epoxide (D) to produce a UV-curable epoxysilicone composition. Component (C') can be represented as $$MD_yD^2_aD^3_bD^H_cM$$

where a+b+c=x, $D^2$ is as described above, and $D^3$ is $$RSi[M^3[OCH(R')CH_2]_oR'']O_{2/2}$$

where $M^3$ is $—CH_2CH_2CH_2—$, R'' is H, $CH_3$, or $CH_2CH_3$, and R'' is R, H, or $—M^3Si\equiv$ from a second silicone polymer chain. (C') can thus be thought of as linear silicone molecule derived from component (A) lightly crosslinked through silicone resin and polyether linkages.

Component (D) is an organic epoxide monomer also bearing unsaturation rendering it capable of hydrosilation reaction with SiH groups present on components (C) or (C') to produce compositions (E) or (E'), respectively, which are each epoxy-functionalized silicone polymers incorporating pendant silicone Q resin without or with block polyether segments, respectively.

The vinyl- or allyl-functional epoxides contemplated are any of a number of aliphatic, glycidyl, or cycloaliphatic epoxy compounds having olefinic moieties which will readily undergo addition reactions with SiH-functional groups. Commercially obtainable examples of such compounds include allyl glycidyl ether, methallyl glycidyl ether, 1-methyl-4-isopropenyl cyclohexeneoxide, limoneneoxide, SCM Corp.), 1,4-dimethyl-4-vinylcyclohexeneoxide (VCHO) (Viking Chemical Co.), and 4-vinyl cyclohexene monoxide. 4-vinyl cyclohexene monoxide (VCHO) is preferred.

In a particular embodiment, a method for synthesizing an ultraviolet radiation curable release coating composition is described. The method comprises the steps of reacting (A) a low molecular weight SiH-containing silicone fluid with (B) a silicone resin of the formula $M^{Vi}MQ$ or $M^{Vi}MTQ$ wherein $M^{Vi}$ is a vinyl-substituted monofunctional chainstopper unit $R^{Vi}R_2SiO_{0.5}$ where $R^{Vi}$ is a vinyl-containing aliphatic hydrocarbon radical, preferably $—CH=CH_2$, and R is an aliphatic or aromatic hydrocarbon radical. The silicone resin has a ratio of monofunctional M to tetrafunctional Q units in the range of about 0.3:1 to about 2.5:1. Optionally, reacting (A) with (B) and (B') an allylated or diallylated polyether of structure $CH_2=CHCH_2O(CHR'CH_2O)_aR''$, where a is an integer from 1 to about 50 and R'' is H, R, or $—CH_2CH=CH_2$ in accordance with the method for reacting (A) and (B) as set forth here and above. The reaction of (A) with (B) and (B') is such that the total moles of SiH in (A) exceeds the total moles of olefin in (B)+(B') to produce an SiH-containing intermediate composition (C) bearing pendent silicone Q resin or, optionally, (C') an SiH-containing intermediate composition bearing pendent silicone Q resin and pendant polyether blocks. In the method, the SiH groups of (C) or (C') are subsequently reacted with (D) an unsaturated epoxy-containing compound thereby creating (E) an epoxy-functional silicone bearing pendent silicone Q resin or (E') an epoxy-functional silicone bearing pendent silicone Q resin plus pendent polyether block segments.

In the method, (A), the SiH-containing silicone fluid is a linear silicone molecule of general formula $MD^H_xD_yM$, where M is $R_3SiO_{\frac{1}{2}}$, $D^H$ is $R(H)SiO_{2/2}$, D is $R_2SiO_{2/2}$, x ranges from about 2 to about 50, y ranges from about 5 to about 500, and R is an aliphatic or aromatic radical. Preferably x is about 2 to about 10, and more preferably about 2 to about 6. Preferably y is about 10 to about 50, and more preferably about 10 to about 20.

(B), the vinyl-functional silicone resin is of the general formula $M^{Vi}MQ$ or $M^{Vi}MTQ$, where $M^{Vi}$ is $CH_2=CH(R)_2SiO_{\frac{1}{2}}$, T is $RSiO_{3/2}$, and Q is $SiO_{4/2}$. The ratio of total M:Q is about 0.3:1.0 to about 2.5:1.0, preferably about 0.5:1.0 to about 1.0:1.0, and more preferably about 0.5:1.0 to about 0.8:1.0. The total weight % vinyl is about 0.5 to about 5.0, preferably about 1.0 to 3.0, and more preferably about 1.0 to 2.0%.

(B'), the allyl-functional polyether is of the general structure $CH_2=CHCHO(CHR'CH_2O)R_z''$, where R' is H, $CH_3$, or $C_2H_5$; and where R'' is H, R, or $-CH_2-CH=CH_2$. Preferably z is about 1 to about 50, preferably about 5 to about 30, more preferably about 5 to about 20.

In the method herein disclosed, (C) and (C'), the intermediate reaction product may be represented as, respectively, (C) is $MD_yD^2_nD^H_mM$, where n+m=x, and where $D^2$ is $RSi(M^2MQ \text{ or } M^2MTQ)O_{2/2}$, and where $M^2$ is $-CH_2CH_2SiR_2O_{\frac{1}{2}}$; and (C') is $MD_yD^2_aD^3_bD^H_cM$, where a+b+c=x, $D^3$ is $RSi(M^3(OCH(R')CH_2)_zOR'')O_{2/2}$, where $M^3$ is $-CH_2CH_2CH_2-$, R' is H, $CH_3$, or $C_2H_5$, and R'' is R, H, or $M^3Si\equiv$ is from an adjacent polymer chain. Preferably n is about 1 to about 20, preferably about 1 to about 10, and more preferably from 1 to about 5. Preferably m is about 1 to about 40, preferably about 2 to about 20, and more preferably from about 2 to about 10. Preferably a is about 1 to about 20, preferably about 1 to about 10, and more preferably from 1 to about 5. Preferably b is about 1 to 10, preferably about 1 to 5, and more preferably 1 to 3.

(D), the unsaturated epoxy-containing compound is selected from aliphatic, cycloaliphatic, or glycidyl epoxy compounds also bearing olefinic groups capable of undergoing hydrosilation addition reactions with SiH-functional groups; preferably selected from allylglycidyl ether, 1,4-dimethyl-4-isopropenyl cyclohexeneoxide, 1,4-dimethylk-4-vinylcyclohexeneoxide, and 4-vinylcyclohexeneoxide, and more preferably 4-vinyl cyclohexeneoxide.

(E) or (E'), the epoxy-functional silicone being the reaction product of (C) or (C') with (D), respectively, where (E) is $MD_yD^2_nD^E_mM$,

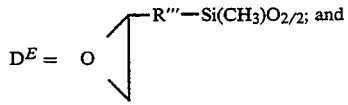

(E') is $MD_yD^2_aD^3_bD^E_cM$,
where M, D, $D^2$, $D^3$, $D^E$, y, n, m, a, b, and c are as defined above, and where R''' is an aliphatic, aromatic, or ether containing aliphatic group; more preferably

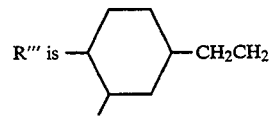

The ultraviolet radiation curable release coating composition of the invention comprises an (E) epoxy-functional silicone bearing pendent silicone Q resin or (E') an epoxy-functional silicone (E') bearing pendent silicone Q resin plus pendent polyether block segments.

(E) or (E') result from the reaction of (A) a low molecular weight SiH-containing silicone fluid and (B) a silicone resin of the formula $M^{Vi}MQ$ or $M^{Vi}MTQ$ wherein $M^{Vi}$ is a vinyl-substituted monofunctional chainstopper unit $R^{Vi}R_2SiO_{0.5}$ where $R^{Vi}$ is a vinyl-containing aliphatic hydrocarbon radical preferably $-CH=CH_2$, and R is an aliphatic or aromatic hydrocarbon radical. Optionally, (E') results from the reaction of (A) and (B)+(B'), an allylated or diallylated polyether of structure $CH_2=CHCH_2O(CHR'CH_2O)_aR''$, where a is an integer from 1 to 50 and R'' is H, R, or $-CH_2CH=CH_2$.

In the reaction, the total moles of SiH in (A) exceeds the total moles of olefin in (B)+(B') to produce (C) an SiH-containing intermediate composition bearing pendent silicone Q resin or, optionally, (C'), an SiH-containing intermediate composition bearing pendent silicone Q resin and pendent polyether blocks. A subsequent reaction of the SiH groups of (C) or (C') with (D) an unsaturated epoxy-containing compound thereby produces (E) or (E'). The silicone resin has a ratio of monofunctional M to tetrafunctional Q units in the range of about 0.3:1 to about 2.5:1. (A), (B), (B'), (C'), (D), (E) and (E') are as defined above, and cure is effected in the presence of 'onium salt catalyst.

In order to promote UV curing, a photocatalyst or combination of photocatalysts may be employed. Preferred photocatalysts for the epoxyfunctional silicone compositions are the onium salts having the formulae:

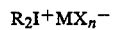

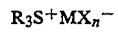

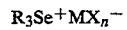

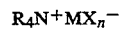

wherein each R is independently an organic radical of from 1 to 30 carbon atoms. Radicals represented by R include aromatic carbocyclic radicals of from 6 to 20 carbon atoms which can be substituted with from 1 to 4 monovalent radicals selected from $C_{(1-8)}$ alkoxy, $C_{(1-8)}$ alkyl, nitrogen, chloro, bromo, cyano, carboxy, mercapto, and the like, as well as aromatic heterocyclic radicals including, e.g., pyridyl, thiophenyl, pyranyl, and the like.

In the onium salt formulas provided above, $MX_n^-$ is a non-basic, non-nucleophilic anion, such as $BF_4^-$, $PF_6^-$, $AsF_6^-$, $SbF_6^-$, $SbCl_6^-$, $HSO_4^-$, $ClO_4^-$, and the like.

The preferred onium salts for use in the composition of this invention are the diaryliodonium salts, such as bis(dodecylphenyl)iodonium hexafluoroarsenate and bis(dodecylphenyl)iodonium hexafluoroantimonate, with bis(dodecylphenyl)iodonium hexafluoroantimonate being the most preferred.

The amount of catalyst used is not critical, so long as proper cure is effected. As with any catalyst, it is preferable to use the smallest effective amount possible; however, for purposes of illustration, catalyst levels of from about 1% to about 5%, and preferably from about 1% to about 3%, by weight based on the weight of the composition have been found suitable.

The following compositions were prepared and are given by way of illustration and should not be construed in any way as limiting the invention.

EXAMPLE I 75 g of an SiH fluid of composition $MD^H_4D_{15}M$, total SiH=0.1425 moles, was dispersed in 75 g toluene in a 500 cc flask. 25 g of an $MM^{Vi}Q$ resin with 1.71 wt % Vi (0.0161 total moles Vi) and an M/Q ratio of 0.67 was added to the reaction mixture as a 50% solution in toluene. The FTIR of this solution was obtained as the reference spectrum. 0.008 g of $RhCl(Ph_3P)_3$ catalyst was then added, and the reaction mixture brought to 110° reflux for 6 hours. FTIR examination of this reaction mixture revealed that 90% of the SiH had reacted with the vinyl groups of the $MM^{Vi}Q$ resin at this time (vs 89% theory). 16 g of VCHO (0.129 moles) was then added to the refluxing solution in dropwise fashion followed by 2 hours reflux, which reduced the SiH to negligible concentration. 0.01 g of methyldicocoamine stabilizer was then added, the batch was vacuum stripped of siloxane light ends, toluene, and excess VCHO to yield 109 g fluid product, 427 cstk viscosity, $n_D^{25}=1.4223$, and 98% solids. Solids content is determined by a weight loss test when 1 g of the sample on an aluminum dish is heated in a forced convection oven at 150° C. for 45 minutes. The weight loss in % volatiles is a measure of the remaining solids. The resulting product incorporated 21.7 wt % $M^{Vi}MQ$ resin, and possessed an Epoxy Equivalent Weight of 766.

EXAMPLES II AND III

Two similar syntheses were carried out yielding products whose properties are tabulated and compared with Example I in the Table below.

TABLE I

| Example | % Vi in $MM^{Vi}Q$ Resin | M/Q | % Resin | Visc. |
|---|---|---|---|---|
| I | 1.71 | 0.67 | 21.7 | 427 |
| II | 2.93 | 0.67 | 21.8 | 725 |
| III | 1.71 | 0.67 | 33.3 | 1385 |

All of these compositions proved to be miscible with a conventional premium release epoxysilicone polymer such as an epoxy functional PDMS fluid having an epoxy equivalent weight (EEW) of about 941 (hereinafter ES-I). The compositions of Examples I, II and III were mixed with 2 wt % bisdodecylphenylionium hexafluoroantimonate photocatalyst solution. A 0.5 mil coating of each Example I and II was cured to smear- and migration-free surfaces when applied to polyethylene coated craft paper (PEK) and exposed to 25 mJ/cm² focused UV light energy in an RPC lab UV Processor in the presence of 2 wt % catalyst solution. The same cure speed of 400 fpm in the RPC device is about what is normally observed with premium release EF-PDMS polymers.

CRA performance of these materials was next evaluated by coating each composition as 20% solids solutions in a 9:1 hexane:acetone solvent blend (using 2 wt % photocatalyst solution based on total epoxysilicone) on PEK sheets with a #3 wire-wound rod to obtain a coatweight of about 1.5 g/m², then passing the sheets through the UV Processor once at 100 fpm under 400 watts/in total UV power to ensure complete cure. A 1 inch wide tape (J&J Surgical tape) was affixed to the cured silicone coatings and the force required to delaminate the tape from the silicone surface at 12 ipm pull speed was measured following 20 hr. aging at 70° C. The release results were as follows:

TABLE II

| Example I | 140–180 grams ('zippy' release) |
|---|---|
| Example II | 160–200 grams ('zippy' release) |
| Example III | 280–300 grams (smooth, even release) |

Of these three candidates, tile release performance of Example III polymer is preferred because it is the highest numerical value and is a smooth, even release.

Blends of Example III with ES-I were coated and cured out of solvent as described above, along with blends of phenolic substituted epoxy silicone (ES-II), such as those taught in U.S. Pat. No. 4,952,657, as a control, and the same tape release test carried out on the cured sheets so obtained. The results are shown below in Table III:

TABLE III

| CRA | Blends of ES-I and CRA | | Release, g/in |
|---|---|---|---|
|  | % ES-I | % CRA |  |
| none | 100 | 0 | 25–30 |
| Ex. III | 50 | 50 | 40–45 |
| Ex. III | 25 | 75 | 55–65 |
| Ex. III | 10 | 90 | 80–100 |
| Ex. III | 0 | 100 | 280–300 |
| ES-II | 50 | 50 | 25–35 |
| ES-II | 25 | 75 | 45–55 |
| ES-II | 10 | 90 | 65–80 |
| ES-II | 0 | 100 | 100–140 |

The epoxysilicone of Example III with pre-reacted Q resin described above is superior to tile phenol-modified ES-II CRA in that it provides a larger differential of release when compared to the unmodified premium release of ES-I. Furthermore, it is coatable at 100% solids, unlike prior art epoxy-functionalized MQ resins. It appears that the 'zippy' uneven release exhibited by the compositions of Examples I and II result from the high epoxy content of these polymers (EEW<800) which has been observed to promote ragged, zippy-type release in UV-cured epoxysilicone coatings derived from these fluids (as reported by Eckberg in Radtech-North America 1988 Conference Proceedings pp 576–586).

The above described syntheses and use of epoxysilicone polymers prepared via sequential hydrosilation addition of $MM^{Vi}Q$ resins, then VCHO, to low molecular weight SiH-functional silicone fluids resulted in products that proved to be superior to existing epoxysilicone terpolymers developed for controlled release applications. An analogous synthesis was carried out by substituting a different class of Q-containing resins for the $MM^{Vi}Q$ resins. The resulting products are useful for UV cure CRA applications when used with conventional epoxysilicone release agents.

EXAMPLES IV-VI

A silicone resin was synthesized and found to conform to the following formula through $Si^{29}$ analysis: $M_{0.64}M^{Vi}{}_{0.06}T_{0.5}Q_5$. This resin was a tacky, semi-liquid material similar in its flow properties to a soft gum. Use of the resin required warming it above room temperature so it would flow 75 g of an $MD_{15}D^H{}_4M$ fluid was mixed with 25 g of the $MM^{Vi}TQ$ resin described above plus 75 g toluene. A reference FTIR spectrum of this solution was obtained. 0.02 g of the platinum catalyst described above was then added, and the reaction was mix agitated at 110° C. for 2 hours, at which time the SiH concentration was found to be reduced to 89% of the original concentration (88% theoretical). 0.01 g of $MeN(C_{18}H_{37})_2$ stabilizer was then added, followed by dropwise addition of 0.16 g of a solution of $RhCl_3[(n-Bu)_2S]_3$ in ethanol containing 1.36% Rh., then 16 g of VCHO, at 110°. This was followed by a brief hold at reflux after which all SiH was found to have reacted. The batch was stripped to 140° C. to yield 107 g of a 310 cstk viscosity fluid product, $n_D{}^{25}=1.4199$, and 97.2% solids. Two other experiments were carried out varying the relative amounts of the $MM^{Vi}TQ$ resin, and VCHO giving two other fluid products. These new compositions are described and compared in Table IV below:

TABLE IV

| Example No. | % MM'TQ Resin | Viscosity | EEW* |
|---|---|---|---|
| IV | 21.6 | 310 cstk | 914 |
| V | 33.5 | 854 | 1157 |
| VI | 40.8 | 1484 | 1340 |

*Calculated Epoxy Equivalent Weight.

Blends of each of these compositions with 2% of the iodonium photocatalyst noted above proved to be hazy, but stable mixtures, which, when manually applied to PEK substrate as 0.5 mil coatings, cured to smear- and migration-free adhesive films on exposure to 30–40 mJ/cm² UV flux using the RPC Processor.

CRA performance of Examples IV and V, the two lower viscosity members of this series, was assessed as described above using the surgical tape as follows:
Example IV: 100–180 g/in (zippy, ratchedy release)
Example V: 220–240 g/in (smooth, even release)

Blends of Example V with ES-I were then coated out of solvent as above, and release versus the surgical tape (20 hour 70° AAR) was again determined:

TABLE V

| % Ex. V | % ES-I | Release, g/in |
|---|---|---|
| 0 | 100 | 20 |
| 50 | 50 | 40 |
| 75 | 25 | 60–75 |
| 90 | 10 | 110–130 |
| 100 | 0 | 220–240 |

The results show that a broad range of release characteristics is achievable in the epoxy silicones prepared in accordance with the present invention.

Epoxysilicones prepared by pre-reaction of $MM^{Vi}TQ$ resins are preferred over those prepared from the MM'Q resins because considerably more pendant resin may be reacted into the epoxy-silicone structure if the T-containing resin is used without unacceptably high viscosity products resulting.

EXAMPLE VII

The composition of Example V described above was synthesized yielding 5 Kg except that the batch proved to be 2000 cstk viscosity and incorporated 33 wt % of a resin of structure $M_{0.7}M^{Vi}{}_{0.07}T_{0.5}Q_{0.5}$ (1.3% Vinyl content).

The following exemplary compositions were made up:

TABLE VI

| Example* | % EX. VII | % ES-I |
|---|---|---|
| VIII | 100 | 0 |
| IX | 90 | 10 |
| X | 75 | 25 |
| XI | 60 | 40 |
| XII | 40 | 60 |
| XIII | 0 | 100 |

*All examples contain 3 parts by weight photocatalyst based upon 100 parts of the composition.

An 18 inch wide 3-roll offset gravure pilot coater was used to apply these compositions to a polyethylene laminated kraft substrate (PEK, from Thilmany Co) at a line speed of 400 fpm, and a coat weight of about 1 g/m². Cure was effected by exposure of the moving web to two focused banks of Fusion Systems (Rockville, Md.) microwave-fired ultraviolet lamps with medium pressure mercury emission spectrum. All coating baths cured to smear- and migration-free surfaces immediately on irradiation.

Samples of each cured coating were laminated with a solvent-borne acrylic PSA sold under the trade designation GELVA 263 by Monsanto, then an SCK (supercalendered kraft paper) face stock applied atop the adhesive layer. 2 inch wide tapes of these laminates were prepared, the release force required to pull the silicone/PEK lamina away from the PSA/face stock lamina was then determined for a 400 ipm pull, at 180° angle. Laminates were aged for 4 weeks at ambient conditions. Example VIII was not tested in this fashion; rather, the surgical tape was applied to cured coatings of this composition as described above with release of 340 g/in noted at 12 ipm pull. (This is a very high release force for this non-aggressive tape.) Release results are tabulated below in Table VII:

TABLE VII

| EXAMPLE NO. | Initial Release | 4 Week Aged |
|---|---|---|
| IX | 155–170 g/2in | 180–190 g/2in |
| X | 115–125 | 120–130 |
| XI | 80–90 | 80–90 |
| XII | 75–85 | 65–70 |
| XIII | 50–55 | 45–55 |

Release was quite stable throughout the testing period. Most importantly, a significant release differential was observed between Example XIII (no CRA) and Example XII (40% CRAEX. XII-Table VI). Prior art CRAs used with the known UV curable epoxysilicone systems (e.g. ES-II noted above and benzoate substituted epoxysilicones having an EEW of 1500, ES-III), were ineffective for raising release at levels <70 wt % of the coating composition when mixed with ES-I.

It has also been found that co-addition of an allylated polyether with the Q resin via hydrosilation prior to VCHO reaction, provides a UV-curable epoxysilicone with superior CRA properties plus enhanced iodonium photocatalyst solubility.

EXAMPLE XIV

The following materials were weighed into a 1 liter flask fitted with a reflux condenser and overhead stirrer: 100 g of an SiH fluid, approximate formula $MD_{15}D^H_4M$, =0.19 moles reactive SiH, 150 g toluene, 90 g of a 52 wt % solution of $M_{0.7}M^{Vi}_{0.7}T_{0.5}Q_{0.5}$ resin in toluene, =0,023 moles vinyl, 6 g of an allyl-stopped polyether, approximate formula $CH_2=CHCH_2O(CH_2CH_2O)_{11}CH_2CH=CH_2$, =0.021 moles allyl. The total olefin content of this mixture was 0.044 moles. An infrared spectrum of the batch was obtained, then 0.05 g of a solution of platinum catalyst was added to the flask, and the reaction mix brought to 112° C. for an hour. The SiH concentration was reduced to 72% of the original concentration at this point, versus a theoretical reduction of 76%. 0.013 g of methyldicocoamine stabilizer plus 0.1 g of an ethanolic solution of $RhCl_3[(bu)_2S]_3$ were added, and the reaction mixture brought to reflux while 22 g (0.177 moles) of VCHO was added dropwise. A 2 hour hold after the VCHO feed reduced the SiH concentration to zero, after which the batch was stripped of solvent and other lite ends in vacuo at 170° C. A 1277 cstk fluid product was ultimately obtained, with 2% volatile content by 150° C. weight loss test described above.

Blends of the composition Example XIV with 1, 2, and 3% of the iodonium photocatalyst solution were uniformly clear, stable solutions, with no sign of any incompatibility. A 2% catalyzed bath was applied to PEK substrate as a 0.5 mil coating, cured to a smear- and migration-free coating on exposure to 72 mJ/cm² UV flux in the RPC Processor. The cure rate was slower than non-polyether-containing CRAs but quite satisfactory nonetheless. 90:10 blends of this and a similar bound Q resin CRA, example V described above, with an epoxy functional PDMS having the form $M^E-D^E_5D_{95}M^E$ and an EEW of 1075 (ES-IV), as well as ES-IV alone, were prepared in a 9:1 hexane:acetone solvent mixture, then coated on PEK using a mechanical lab coater and a #3 wire-wound rod. Cure was effected with 2% iodonium photocatalyst, based on polymer solids, on exposure to 150 mJ/cm² UV flux. Cured coatings were later laminated with Monsanto GELVA 263 solvent-borne acrylic PSA, then top-laminated with SCK paper stock. Release was recorded for 2 inch wide strips pulled at 400 ipm, 180°<. The results were as follows:

TABLE VIII

| EX-IV | 50 g/2in |
|---|---|
| 90% Example V | 220 g/2in |
| 90% Example XIV | 425 g/2in |

It is apparent that the presence of the polyether in the Q containing epoxysilicone CRA of Example XIV not only improves compatibility of the material with 'onium salt catalysts, but unexpectedly and dramatically raises the release force almost twofold. This is a desirable characteristic in a CRA, since such a CRA allows the end-user a large range of release values to fit a variety of application requirements. The higher the release range attainable the more useful the CRA can be. The level of release may be proportional to the amount of CRA in the system.

In accordance with the foregoing, the invention is directed to forming a UV-curable epoxysilicone CRA composition by means of consecutive hydrosilation reactions:
1) $MD_x{}^HD_yM + M^{Vi}MQ$ or $M^{Vi}MTQ$ and/or up to about 50 weight % of allyl polyether based upon the total of (B) and (B')
2) $MD_yD_u{}^2D_m{}^HM$ and/or $MD_yD_a{}^2D_b{}^3D_c{}^HM$
3) $MD_yD_n{}^2D_m{}^EM$ and/or $MD_yD_a{}^2D_b{}^3D_c{}^EM$
where the various components are as defined above.

In particular embodiments, controllable release properties may be effectively and predictably achieved by substantially proportional incorporation of the CRA compositions herein disclosed.

While there have been described what at present are considered to be the preferred embodiments of the present invention, it will be readily apparent to those skilled in the art that various changes may be made therein without departing from the invention and it is intended in the claims to cover such changes and modifications as fall within the true spirit and scope of the invention.

What is claimed is:

1. A UV curable epoxysilicone polymer comprising:
the reaction product of
a linear low molecular weight SiH containing fluid of the formula $$MD^H{}_xD_yM,$$

where
M is $R_3SiO_{\frac{1}{2}}$,
$D^H$ is $R(H)SiO_{2/2}$ 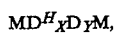
D is $R_2SiO_{2/2}$
x ranges from about 2 to about 50, y ranges from about 5 to about 500, and R is an aliphatic or aromatic radical and
a $M^{Vi}MQ$ or $M^{Vi}MTQ$ resin having a ratio of M:Q of about 0.3:1.0 to about 2.5:1 and wherein the total weight % vinyl is about 0.5 to about 5.0 based on the weight of resin resulting in a hydrosilation partial reaction product and;
which hydrosilation partial reaction product is then reacted by hydrosilation with an epoxy containing unsaturated compound selected from aliphatic or cyclo aliphatic epoxies, said reaction product being an epoxy-functional silicone bearing pendant silicone Q resin moieties.

2. The polymer of claim 1 wherein x is about 2 to about 10 and y is about 10 to 50.

3. The polymer of claim 2 wherein x is about 2 to about 6 and y is about 10 to 20.

4. The polymer of claim 1 wherein the weight % vinyl is about 1.0 to about 3.0.

5. The polymer of claim 4 wherein the weight % vinyl is about 1.0 to about 2.0.

6. The polymer of claim 1 wherein the M:Q ratio is about 0.5:1.0 to about 1.0:1.0.

7. The polymer claim 6 wherein the M:Q ratio is about 0.5:1.0 to about 0.8:1.0.

8. A UV curable epoxysilicone polymer comprising:
the reaction product of
a low molecular weight SiH containing fluid and a $M^{Vi}MQ$ or $M^{Vi}MTQ$ resin and an allylated or diallylated polyether of the formula $CH_2=CHCH_2O(CHR'CH_2O)_aR''$, where a is an integer from 1 to about 50 R' is H, $CH_3$ or $C_2H_5$ and R" is H, R, or $-CH_2CH=CH_2$, resulting in a hydrosilation partial reaction product which hydrosilation partial reaction product is then reacted by hydrosilation with an epoxy containing unsaturated compound selected from aliphatic or cyclo aliphatic epoxies, said reaction product being an epoxy-functional silicone bearing pendant silicone Q resin moieties plus pendent polyether block segments.

9. The polymer of claim 8 wherein the SiH containing fluid is a linear silicone molecule of general formula $$MD^H{}_xD_yM'$$

where
M is $R_3SiO_{\frac{1}{2}}$,
$D^H$ is $R(H)SiO_{2/2}$
D is $R_2SiO_{2/2}$ x ranges from about 2 to about 50, y ranges from about 5 to about 500, and R is an aliphatic or aromatic radical.

10. The polymer of claim 9 wherein x is about 2 to about 10 and y is about 10 to 50.

11. The polymer of claim 10 wherein x is about 2 to about 6 and y is about 10 to 20.

12. The polymer of claim 8 wherein the ratio of total M:Q of the resin is about 0.3:1.0 to about 2.5:1.

13. The polymer of claim 12 wherein the M:Q ratio is about 0.5:1.0 to about 1.0:1.0.

14. The polymer claim 13 wherein the M:Q ratio is about 0.5:1.0 to about 0.8:1.0.

15. The polymer of claim 8 wherein the resin contains from about 0.5 to about 5.0 weight percent vinyl based on the weight of resin.

16. The polymer of claim 15 wherein the weight % vinyl is about 1.0 to about 3.0.

17. The polymer of claim 16 wherein the weight % vinyl is about 1.0 to about 2.0.

18. A UV curable epoxysilicone polymer comprising: the reaction product of
a low molecular weight linear SiH containing fluid of the formula $$MD^H{}_xD_yM'$$

where
M is $R_3SiO_{\frac{1}{2}}$,
$D^H$ is $R(H)SiO_{2/2}$
D is $R_2SiO_{2/2}$
x ranges from about 2 to about 50, y ranges from about 5 to about 500, and R is an aliphatic or aromatic radical and a $M^{Vi}MQ$ or $M^{Vi}MTQ$ resin having a ratio of M:Q of about 0.3:1.0 to about 2.5:1 and wherein the total weight % vinyl is about 0.5 to about 5.0 based on the weight of resin,
and an allylated or diallylated polyether of the formula $CH_2=CHCH_2O(CHR'CH_2O)_aR''$, where a is an integer from 1 to about 50 R' is H, $CH_3$ or $C_2H_5$ and R" is H, R, or $-CH_2CH=CH_2$, resulting in a hydrosilation partial reaction product which hydrosilation partial reaction product is then reacted by hydrosilation with an epoxy containing unsaturated compound selected from aliphatic or cyclo aliphatic epoxies, said reaction product being an epoxy-functional silicone bearing pendant silicone Q resin moieties plus pendent polyether block segments.

* * * * *